Sept. 16, 1952 L. HORNBOSTEL 2,610,517
BELT DRIVE FOR PAPERMAKING MACHINES
Filed March 11, 1946 2 SHEETS—SHEET 1
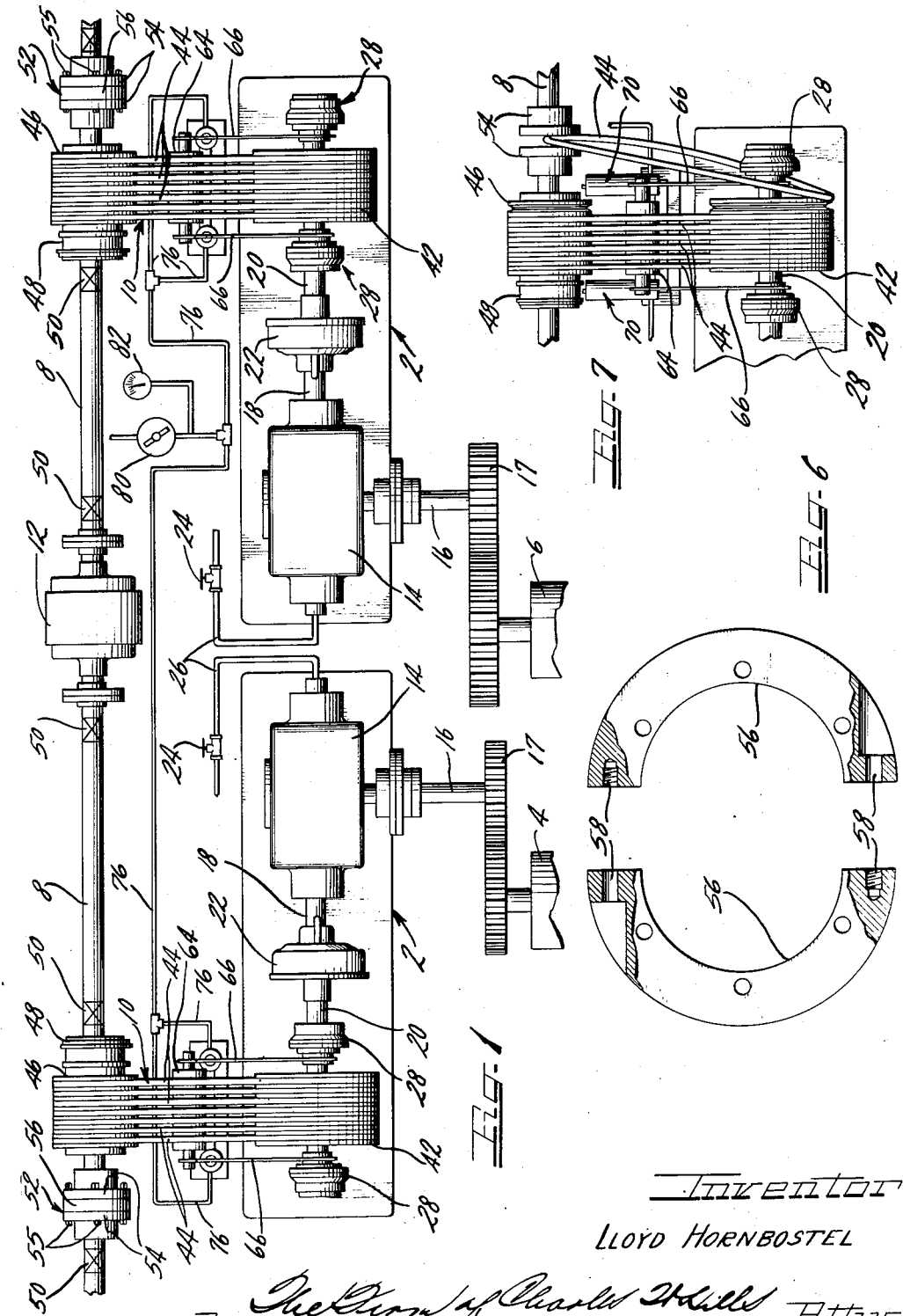
Inventor
LLOYD HORNBOSTEL

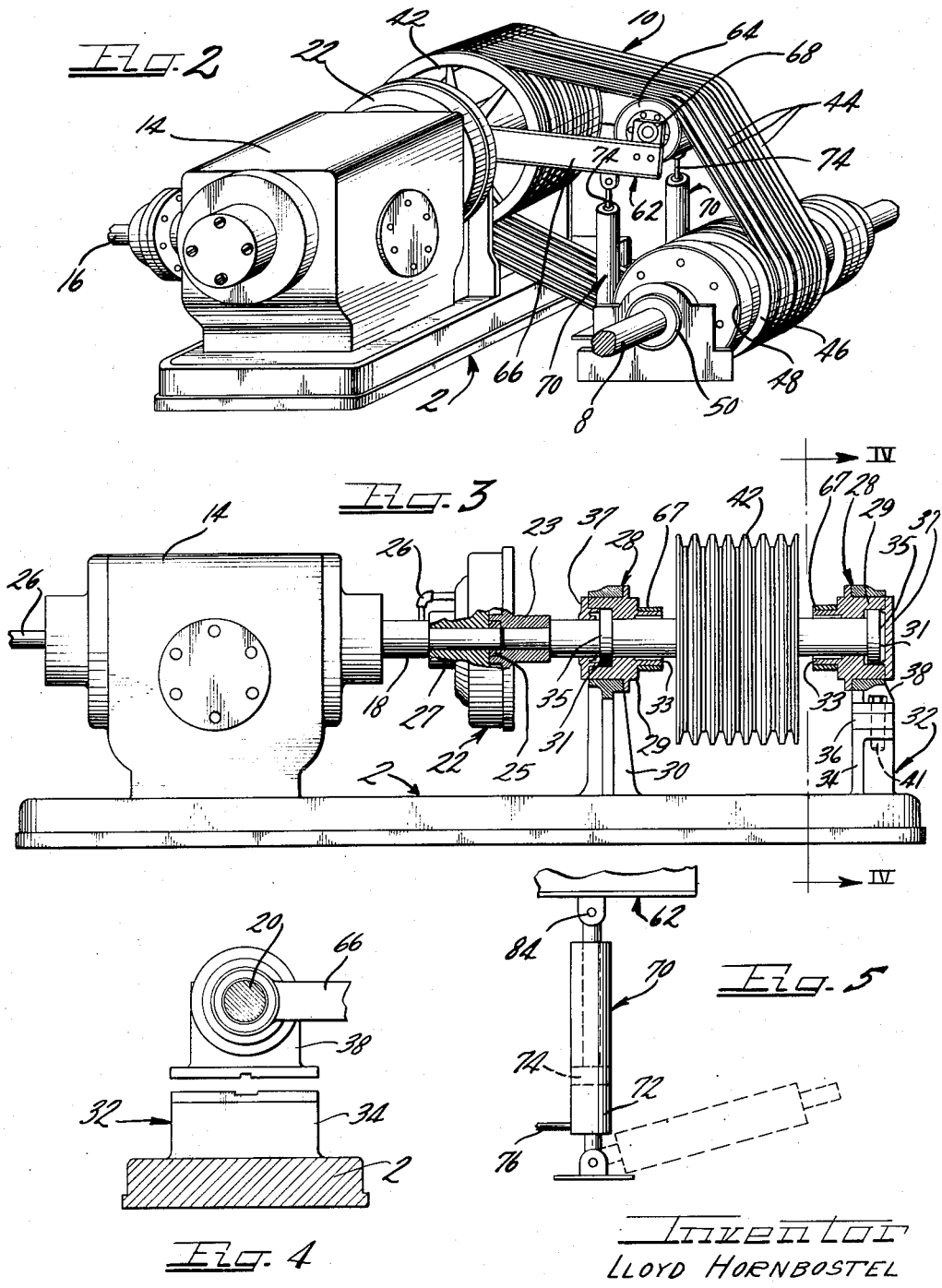

Patented Sept. 16, 1952

2,610,517

UNITED STATES PATENT OFFICE 2,610,517

BELT DRIVE FOR PAPERMAKING MACHINES

Lloyd Hornbostel, Beloit, Wis., assignor to Beloit Iron Works, Beloit, Wis., a corporation of Wisconsin Application March 11, 1946, Serial No. 653,643

8 Claims. (Cl. 74—242.11)

This invention relates to improvements in belt driving mechanisms and particularly to improved belt driving mechanisms for paper making machines.

It has heretofore been found desirable to utilize a belt drive between each of the independently rotating sections of a paper making machine and the drive shaft of such machine which is generally provided to maintain the necessary high degree of speed correlation between the plurality of independently driven rotating sections.

It is particularly desirable to utilize a well known form of belt drive wherein one of the driving pulleys is circumferentially adjustable to change the effective radius of such pulley and thus effect an adjustment of the speed ratio between the two rotating mechanisms connected by the belt drive and hence provide draw adjustment for successive sections of the paper making machine.

Such circumferential adjustment of the pulley naturally results in varying degrees of looseness of the associated belt and the elimination of such looseness in the application of such adjustable belt drive to paper making machinery has been a particularly difficult problem.

The well known expedient of providing an idler pulley which is spring or weight biased into engagement with the belt to take up any looseness in the belt resulting from the circumferential adjustment of its adjustable pulley, is not suited for applications such as paper making machinery, wherein the speed correlation between the various rotating sections must be maintained with a very high degree of precision. The spring-biased belt-tightening arrangement obviously has the inherent disadvantage of producing variable degrees of tension in the belt with which it is associated, depending upon the amount of slack which the belt-tightening mechanism is required to absorb. The weight biased arrangement is subject to vibration and "dancing" of the weights. Accordingly, when applied to paper making machinery, the resulting variations in belt tension between each of the independently rotating sections and the main drive shaft permits an appreciable variation in speed between the various sections due to differences in belt slippage resulting from the varying belt tensions.

Another problem arising in the application of a belt drive to paper making machinery lies in the difficulties normally attendant upon the replacement of a defective or worn-out belt. It is an extremely undesirable as well as a time consuming procedure to remove the pulley shaft from its bearings in order to effect replacement of a belt. This is particularly true in the case of replacing a belt on the main drive shaft of a paper making machine, which is an extremely long shaft and hence quite difficult to adjust in its rotational relationship with its bearings.

Accordingly it is an object of this invention to provide an improved belt driving mechanism.

Another object of this invention is to provide an improved belt driving mechanism for paper making machineries or the like wherein a high degree of speed correlation must be maintained between various independently rotating sections which are to be coupled by the belt drive to a main drive shaft.

A particular object of this invention is to provide an improved belt-tightening mechanism which is particularly adaptable to eliminating belt slack in belt drives utilizing a circumferentially adjustable pulley.

A further object of this invention is to provide an improved belt slack adjusting mechanism characterized by the use of an hydraulic force to maintain a desired tension in the belt independent of the amount of looseness required to be taken up in the particular belt.

Another object of this invention is to provide an improved belt drive between various independently rotating sections of a paper making machine and a main drive shaft characterized by the utilization of an hydraulically actuated belt-tightening mechanism and the provision of a common fluid supply to each of the hydraulic belt-tightening mechanisms to maintain substantially identical belt tension between each of the rotating sections and the drive shaft.

A specific object of this invention is to provide an improved method for replacement of a driving belt in paper making machinery.

A further object of this invention is to provide an improved coupling for a belt-driven shaft permitting the replacement of the belt without removal of the shaft from its bearings.

Another object of this invention is to provide a novel bearing support for a belt-driven shaft permitting the replacement of the belt on the shaft without removal of the shaft from its bearings.

The specific nature of this invention as well as other objects and advantages thereof will be apparent from the following detailed description of the annexed sheet of drawings which, by way of preferred example only, illustrate one embodiment of this invention.

On the drawings:

Figure 1 is a diagrammatic elevational view of a portion of a paper making machine incorporating adjustable belt drives constructed in accordance with this invention.

Figure 2 is a perspective view of a portion of a paper making machine showing a belt drive in accordance with this invention connecting one of the rotary sections of the paper making machine to the drive shaft.

Figure 3 is an elevational view, partly in section, showing the angle drive gear unit for one of the rotating sections, one of the belt pulleys, and a bearing support constructed in accordance with this invention.

Figure 4 is a sectional view taken along the plane IV—IV of Figure 3 with the spacer element removed.

Figure 5 is a detail elevational view of the hydraulic actuator for the idler pulley support member.

Figure 6 is an elevational view, partly in section, of the spacer member utilized in the novel coupling embodying this invention.

Figure 7 is a partial elevational view of Figure 1 illustrating the method of replacement of one of the belts.

As shown on the drawings:

Referring to Figure 1, the numerals 2 indicate generally the angle drive gear units for the successive independently rotating sections of a paper making machine which may, for purposes of example only, comprise the forming section 4 and the press section 6, respectively. Each of the angle drive gear units 2 is driven from a main drive shaft 8 by a belt driving mechanism in accordance with this invention, indicated generally by the numeral 10. The main drive shaft 8 is illustrated as being driven by an electric motor 12 but it should be understood that other forms of prime movers may be utilized if desired.

Since each of the angle drive gear units 2 and belt drive mechanisms 10 are identical, only one of such units will be described in detail. Gear unit 2 comprises a conventional variable speed, angular drive gear box 14 having an input power shaft 18 and an output power shaft 16 angularly disposed thereto which drives the respective associated rotating mechanism of the paper making machine through gears 17. Input shaft 18 is connected to drive shaft 8 through the belt drive mechanism 10.

Input shaft 18 is coupled to a pulley shaft 20 through an air clutch 22 which may comprise any one of several well known forms. Air clutch 22 is preferably constructed to provide cantilever support for the pulley shaft 20, having a driven head portion 23 which has bearing support on a bearing member 25 on the end of shaft 18. A conventional air operated diaphragm (not shown) connects a driving head 27 to driven head 23. Air clutch 22 may be controlled manually by a suitable valve 24 connected in an air supply pipe line 26.

The pulley shaft 20 is journaled in a pair of axially spaced bearings 28. Each bearing 28 (Figure 3) comprises an annular journal portion 29 having a cylindrical recess 31 in one end and an annular, axially projecting flange 33 on the other end. An anti-friction bearing 35 is mounted in recess 31 to journal pulley shaft 20. An annular cap 37 is provided to seal the end of the recess 31. The hub portion 67 of an idler pulley support arm 66 is pivotally journalled on flange 33. The particular bearing 28 located adjacent the air clutch 22 is rigidly supported in an upstanding bearing support member 30. The bearing 28 on the end of pulley shaft 20 is, however, supported by a specially constructed bearing support 32. Bearing support 32 is essentially formed in three pieces (Figures 3 and 4) comprising a base member 34, a removable spacer member 36 which rests on base member 34, and a bearing housing 38 which is in turn supported on the top of spacer member 36. Suitable keys (not shown) and vertical bolts 41 are provided to prevent shifting of the various components of the special bearing support 32.

The primary purpose of special bearing support 32 is to provide a convenient means for removal of the driving belt without disturbing the mounting of the pulley shaft 20 in its bearings 28. As will be brought out in detail later, such driving belt may be readily removed by knocking the spacer member 36 out of the special bearing support 32. In this condition the pulley shaft 20 is adequately supported by fixed bearing 30 and air clutch 22.

Intermediate the bearings 28, a conventional belt pulley 42 is secured on pulley shaft 20. While not limited thereto, belt pulley 42 is shown to be of the type permitting the application of a plurality of V-belts to its external surface. A similarly shaped pulley 46 is mounted on drive shaft 8 adjacent belt pulley 42 and receives the belt elements 44 to effect the driving connection between the angle drive gear unit 2 and the drive shaft 8.

Preferably the pulley 46 comprises a well known commercial construction permitting the circumference of its belt-engaging surfaces to be adjusted by conventional adjusting mechanisms housed in hub portions 48 on adjustable pulley 46. It should be understood, however, that the particular adjusting mechanisms by which the effective circumference of adjustable pulley 46 may be varied constitutes no part of this invention.

As is obvious to those skilled in the art, the drive shaft 8 is supported by a plurality of bearings 50 spaced along the shaft and indicated schematically in Figure 1. It will be appreciated that the drive shaft 8 is a member of great total length and has a large number of supporting bearings 50; accordingly the application of a special bearing support such as the bearing support 32 heretofore described would be of little assistance in permitting the ready replacement of the belt element 44.

In accordance with this invention a special coupling element 52 is provided which is mounted on drive shaft 8 immediately adjacent the adjustable pulley 46 and intermediate such pulley and the next bearing support 50. The coupling 52 comprises a pair of axially shaped, complementary coupling parts 54 which are separated by a split ring-like spacer 56 (Figure 6). The two half portions of spacer 56 are assembled into a unitary structure by suitable bolts (not shown) which cooperate with a pair of generally tangentially disposed, tapped holes 58.

To effect the coupling of coupling parts 54, a plurality of peripherally spaced, axially parallel bolts 55 are threaded through aligned holes in the coupling parts 54 and spacer 56.

The belt-tightening device embodying this invention comprises a movable idler pulley support 62 and an idler pulley 64 rotatably supported thereon. Idler support 62 comprises a pair of spaced support arms 66 having a hub-like end 67 thereof pivotally mounted on annular flanges 33 of the bearings 28. The support arms 66 are thus disposed in spaced relation on each side of the belt pulley 42.

The free ends of the arms 66 are provided with suitable bearings 68 which journal the idler roller 64, supporting such idler roller within the circumference of the belt elements 44.

To take up the slack in the belt, and to maintain a desired tension in the belt irrespective of the particular circumferential adjustment of the adjustable pulley 46, a pair of hydraulic actuators 70 are provided constituting a conventional hydraulic cylinder 72 and cooperating piston 74 which are relatively movable under hydraulic force exerted by a suitable fluid supplied under pressure to the actuators 70 through pipe line 76.

It should be noted that the hydraulic actuators 70 for each of the belt drive mechanisms of the paper making machine are supplied from a common fluid supply source (not shown) through an adjustable manually operated valve 80 and accordingly the same pressure may be applied to each of the hydraulic actuators, thereby assuring uniform tension in each of the various belt drives. A suitable gauge 82 may be provided in the hydraulic pressure supply line to afford an indication of the pressure applied to the actuators 70.

One element of the hydraulic actuator 70, for example the cylinder 72, is pivotally secured to a suitable fixed base member 82. The other element of the hydraulic actuator, the piston 74, is detachably pivotally secured to the free end of support arm 66. The detachable connection preferably comprises a removable pin 84.

From the foregoing description it will be apparent that a belt drive mechanism embodying this invention provides means for maintaining any desired tension on the belt elements and will uniformly maintain such tension. There is no tendency for the belt-tightening idler pulley to vibrate, inasmuch as the hydraulic actuators 70 substantially absorb any vibrational tendency. Furthermore, substantially the same belt tension may be maintained between each of the plurality of belt driving mechanisms generally required in a paper making machine, thereby insuring maintenance of the desired speed correlation between the various independently rotating sections of the machine to a high degree of precision.

It will be further noted that any of the belt elements 44 may be readily replaced in a belt driving mechanism by the method embodying this invention. As illustrated in Figure 7, a belt element 44 may be replaced by releasing hydraulic tension on the belts and by removing the pin 84 constituting the pivotal connection between the hydraulic actuator 70 and one of the support arms 66. The hydraulic actuator 70 may then be pivoted to one side, as illustrated in Figure 5, next the spacer element 56 is removed from surrounding relation to the drive shaft 8 through the opening thus provided. The belt element 44 is then removed from surrounding relation with the idler pulley 64 through the opening provided between actuator 70 and support arm 66. Finally, the belt is removed from surrounding relation to pulley shaft 20 by removing the spacer member 36 from special bearing support 32. Obviously, a new belt element may be assembled on the belt driving mechanism by passing the belt through the various openings just described. Replacement of the spacer 56 in coupling 52, the pin 84 in the hydraulic actuator 70, and the spacer member 36 in the special bearing support 32, will reassemble the belt driving mechanism in its original condition.

It should be particularly noted that the entire belt replacement operation does not disturb the bearing relationship between either the drive shaft 8 and its bearings 50 or the pulley shaft 20 and its bearings 28.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a belt drive including a rotating primary pulley and an endless looped belt engageable in driving relation therewith and adaptable to engage a drive pulley, the improvements of a pulley support pivotally movable about the rotational axis of said primary pulley, a secondary pulley rotatably mounted on said pulley support within the loop of said belt and movable with said pulley support to engage the belt, a fluid operated actuator having two relatively movable parts, means for pivotally securing one of said parts in fixed relation to the axis of said primary pulley, means for removably securing the other of said parts to said pulley support, and means for energizing said actuator to urge said pulley support in a direction to tighten the belt by said secondary pulley, whereby removal of the other of said parts from said support accommodates the looping of said belt about said secondary pulley.

2. In combination, a driving pulley rotating on a fixed axis, a driven pulley rotating on a second fixed axis, an endless belt looped about said pulleys in driving relation therewith, an idler pulley support pivotally movable about the axis of one of said pulleys, an idler pulley rotatably mounted on said idler pulley support and disposed within the loop of said belt for movement with said pulley support to engage said belt, and fluid operated means removably attached to said pulley support for urging said pulley support in a direction to tighten the belt by said idler pulley, thereby maintaining a desired tension on said belt independent of adjustment of said pulleys and the removable attachment of said fluid operated means accommodating the looping of said belt about said idler pulley.

3. In a belt drive including a fixed axis rotating primary pulley and a belt engageable therewith in driving relation and adaptable to engage a drive pulley, the improvements of a pulley support including a pair of arms respectively disposed on opposite sides of said primary pulley, a secondary pulley rotatably mounted between said arms and lying within the circumference of the belt, an hydraulic actuator, means for detachably connecting said actuator to said pulley support, thereby permitting convenient belt replacement, and means for energizing said actuator to urge said secondary pulley outwardly against said belt to tighten the belt.

4. In a paper making machine, a plurality of rotating sections, a main drive shaft, a plurality of bearings supporting said drive shaft, a plurality of belt and pulley connections respectively connecting each of said rotating sections and said drive shaft, said pulleys being located intermediate said bearings, a plurality of couplings in said drive shaft respectively disposed immediately adjacent said pulleys, each of said couplings comprising a pair of axially spaced coupling parts and a removable spacer therebetween, thereby permitting belt replacements without removal of said drive shaft from said bearings.

5. In a belt drive mechanism having a shaft, a pulley mounted adjacent an end of the shaft, and a belt surrounding said pulley in driving relation and adapted to engage a drive pulley, the improvements of a bearing engaging the end of the shaft, a fixed support for said bearing, and a spacer member removably mounted between said bearing and said fixed support, thereby permitting belt replacement without removing said shaft from said bearing.

6. In a paper making machine, a plurality of rotating sections, a main drive shaft, a plurality of belt and pulley connections respectively connecting each of said rotating sections and said drive shaft, a plurality of idler pulleys respectively movable into engagement with said belt, fluid operated means individually urging said idler pulleys in a direction to tighten their respective belt, and means for supplying a common fluid pressure to said hydraulic means, whereby substantially identical belt tension may be maintained between each of the rotating sections and said drive shaft.

7. In a paper making machine, a plurality of independently driven rotating sections, a rotatable drive shaft, a plurality of belt and pulley connections respectively connecting each of said rotating sections and said drive shaft, a plurality of identical pulley supports respectively pivotally mounted adjacent said belt connections, fluid operated means individually urging each of said pulley supports in a direction to tighten said belts on the respective secondary pulleys, and means for supplying a common fluid pressure to said hydraulic means whereby substantially the same belt tension may be maintained between each of said rotating sections and said drive shaft.

8. In a paper machine drive, a base, a pair of spaced upstanding supporting posts carried by said base, one of said posts including vertically aligned separable sections, a bearing surmounting each of said posts, a shaft journaled by said bearings for rotation, a primary belt pulley mounted on said shaft between said bearings for rotation therewith, an endless belt surrounding said primary pulley and engageable therewith in driving relation and adopted to engage a drive pulley, a pair of pulley support arms pivotally attached to said shaft for pivotal movement about the axis thereof, a secondary pulley journaled by said arms and disposed within the loop of said belt, an upstanding fluid pressure actuated cylinder and piston assembly for each of said arms, the piston of that assembly closest to said one post being detachably secured to its corresponding arm, and means including a source of fluid under pressure for actuating or energizing said actuators, the lapping of said belt about said pulley and said primary pulley being facilitated by the removal of one of the sections of said one post and the detaching of said one actuator piston.

LLOYD HORNBOSTEL.

REFERENCES CITED

The following references are of record in the file of this patent:

UNITED STATES PATENTS

| Number | Name | Date |
|---|---|---|
| 750,497 | Sperry | Jan. 26, 1904 |
| 771,006 | Giraud | Sept. 27, 1904 |
| 804,980 | Reiss | Nov. 21, 1905 |
| 934,248 | Wallace et al. | Sept. 14, 1909 |
| 1,383,850 | Pitts | July 5, 1921 |
| 1,986,325 | Dallwigk, Jr. | Jan. 1, 1935 |
| 2,010,796 | Bourque | Aug. 6, 1935 |
| 2,084,862 | Moser | June 22, 1937 |

FOREIGN PATENTS

| Number | Country | Date |
|---|---|---|
| 852,103 | France | Oct. 13, 1939 |